Oct. 27, 1942.  J. I. W. CARLSON  2,299,794
CLOTHESLINE FASTENER
Filed June 28, 1941   2 Sheets-Sheet 1
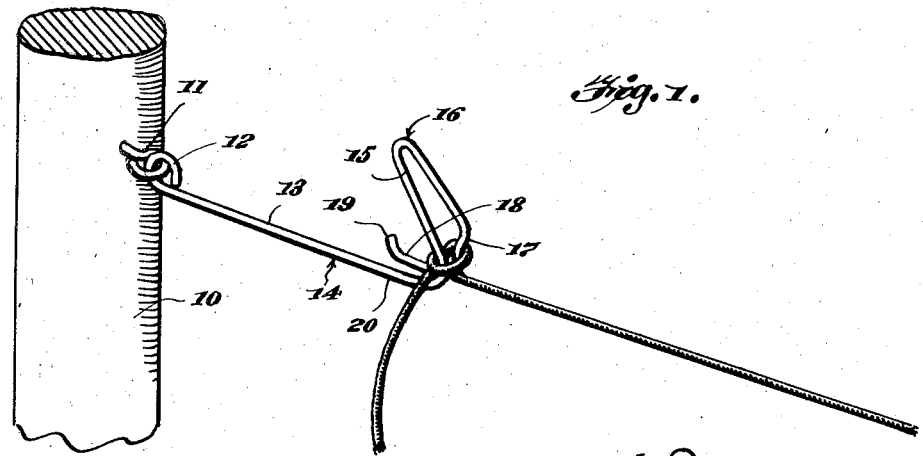
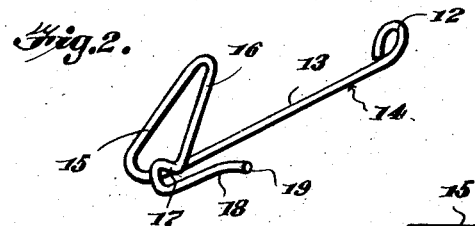
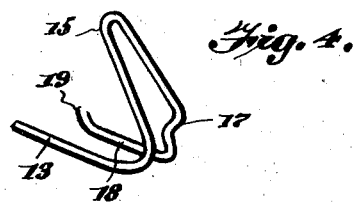
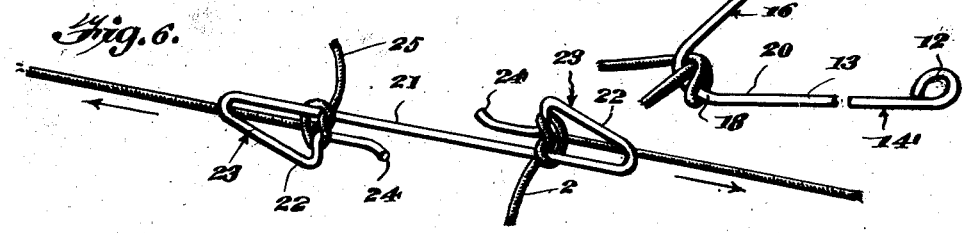
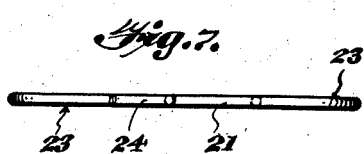
Inventor
JOHN I. W. CARLSON
By Irving A. McCathran
Attorney Oct. 27, 1942.  J. I. W. CARLSON  2,299,794
CLOTHESLINE FASTENER
Filed June 28, 1941  2 Sheets-Sheet 2
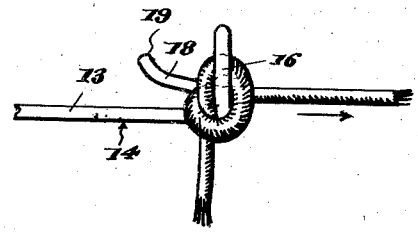
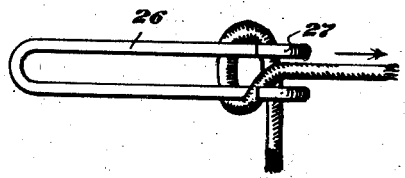
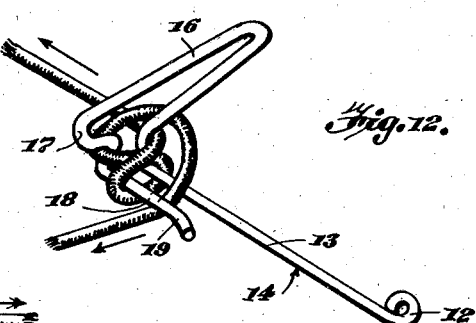
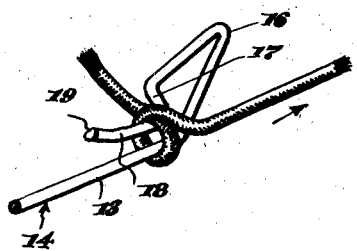
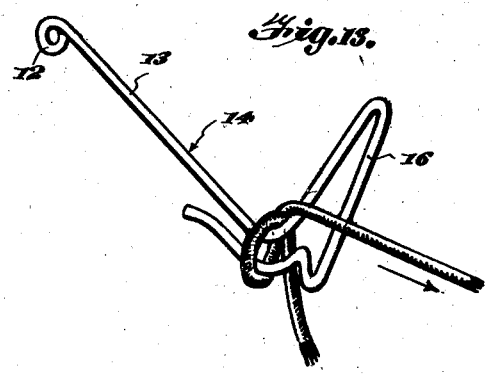
Inventor
JOHN I. W. CARLSON Patented Oct. 27, 1942

2,299,794

UNITED STATES PATENT OFFICE 2,299,794

CLOTHESLINE FASTENER

John I. W. Carlson, Washington, D. C.

Application June 28, 1941, Serial No. 400,320

4 Claims. (Cl. 24—131)

This invention relates to clothes line fasteners, and the like, and has for one of its objects the production of a simple and efficient hook for holding a clothes-line, rope and some chains in a secure position and in such a position as to prevent the line, rope or chain from becoming accidentally disconnected or released.

A further object of this invention is the production of a simple and efficient means for guiding a clothes-line to a tying position as the line is being placed about the fastener in a manner whereby a line or the like may be made fast or secured by using only one hand to automatically lock or tie the line, rope or chain itself within the folds of the hook, independently of any pincer jaws or spring action of the hook or other moving parts to provide such a lock.

Other objects and advantages of the present invention will appear throughout the following specification and claims.

In the drawings:

Figure 1 is a perspective view of the fastener, support and portion of a line;

Figure 2 is a perspective view of the fastener;

Figure 3 is a top plan view of the fastener;

Figure 4 is a perspective view of the hook end of the fastener,

Figure 5 is a side elevational view of the fastener;

Figure 6 is a perspective view of a line splicer;

Figure 7 is a side elevational view of the splicer;

Figure 8 is a perspective view of a further modified form of the fastener;

Figure 9 is a view showing one type of knot tied upon the improved fastener;

Figure 10 is a view showing another type of knot tied upon the form of fastener shown in Figure 8;

Figure 11 is a view showing a further type of knot tied upon the fastener;

Figure 12 is a view showing a still further type of knot tied upon the fastener;

Figure 13 is a view showing a further modified type of knot tied upon the fastener.

By referring to the drawings, it will be seen that 10 designates a post or other support which carries an anchoring eye 11, to which is secured the eye 12 carried at one end of the shank 13 of the fastener 14. The fastener 14 is preferably formed of a strand of heavy wire, as shown. The end of the shank 13 opposite the eye 12 terminates in an outwardly extending and rearwardly inclined portion 15, which portion 15 is bent backwardly upon itself to provide a backwardly inclined tapering hook 16. The hook 16 is provided with an inwardly bent shoulder portion 17 extending at right angles to the shank 13 and on a plane above and laterally of the shank 13, as shown in Figures 1, 2 and 4. The shoulder portion 17 is bent downwardly at its inner end and terminates in a finger 18 which extends in spaced relation and substantially parallel to the shank 13 to provide a restricted neck. An outwardly bent end 19 is carried by the outer end of the finger 18. The outwardly bent portion 19 provides a means for guiding a line to clamping position between the shank 13 and finger 18 while a knot is being formed or tied. The junction between the hook 16 and the shank 13 and the finger 18 is curved, as shown at 20 in Figure 5.

Various knot formations may be easily tied upon the present fastener. The knot shown in Figure 1 may be formed by placing the line across the junction of the portion 15 with the shank 13 and the junction of the hook 16 and the finger 18, then pulling the line under the hook and throwing the line over the hook and drawing the line down between the shank 13, and finger 18, causing the line to lock when strain is exerted in the direction of the arrow. The knot shown in Figure 1 is formed by looping the right-hand end of the line over the hook 16 and between the shank 13 and the finger 18 from left to right, whereas the knot shown in Figure 4 is formed by looping the left-hand end of the line under the hook and between the shank 13 and hook 16 from right to left.

In Figures 6 and 7, there is shown a splicer formed from a single strand of wire and operating on the same principle as the fastener above described. This splicer confines a central shank 21 and oppositely bent outwardly inclined portions 22 at opposite ends, to provide oppositely extending tapering ends 23 upon opposite sides of the shank 21. Each inclined portion 22 at its inner end is provided with an inwardly bent shoulder portion extending toward the shank 21 and terminating in an outwardly flared finger 24 flaring slightly away from the shank 21 to provide a restricted neck. This splicer is especially adapted to connect adjoining ends of two lines together and the knots are formed in the same manner as described above, one being formed by looping the line from right to left, and the other by looping the line from left to right so that the pull of the lines in the direction of the arrows will tend to hold the lines tight. The knots may be adjusted by pulling upon the free ends 25 of the lines.

In Figure 8 it will be noted that a U-shaped body portion 26 is provided having rearwardly inclined equally spaced upwardly extending hooks 27 at one end around which the knot is formed in the manner shown.

From the foregoing description it will be seen that a very simple hook has been provided for the quick and easy fastening of clothes-lines, tent ropes, awning cords and tarpaulin lines on trucks, and the like. The device may be used for heavier hooks, if desired, for securing tow cables and ropes on trucks, buses and the like. The hook may be made in various sizes to satisfy the use to which the hooks are to be put such for instance as on boats, yachts, and army and navy equipment of various characters, where speedy rope or line fastening and releasing is essential.

The hook may be made in several shapes and forms as illustrated, but the anchor tie of the line or starting tie remains the same as that illustrated in Figures 1 and 6. Other types of knots are illustrated in Figures 5 and 9 and 9 to 13 inclusive, and it should be understood that many types of knots may be employed without departing from the spirit of the invention. The tie or knot is intended for use anywhere within the length of the line or rope to bend support or to alter the course of the rope or line and the fastener is made in such a manner that the slack or lost motion in the line may be taken up by simply pulling on the free end of the line. The knot is tied in such a way as to allow the line to readily slip in one direction but to lock itself instantly as tension is reversed. Then by passing the rope or line around the hook and between the fork as illustrated in Figures 1 and 6, the line becomes securely locked and will not slip in either direction. Consequently, if one section of the line should snap or break the remaining section will not be affected.

In tying the knot, the projection or shoulder portion 17 is provided to force the first loop backwards and over the top of the second loop when pulling on the free end of the rope, as illustrated in Figure 10 of the drawings, thus making the tie secure.

From the foregoing description, it will be noted that there is produced a fastener to which a line may be secured with a minimum amount of effort and by merely passing the line behind the hook and looping the line over the hook, and between the shank 13 and the finger 18, the line may be easily locked in position and it will only require one hand to form the knot. The knot may be either formed by moving the line toward the right or toward the left to provide a reverse knot.

Certain detail changes in construction may be employed without departing from the spirit of the invention, so long as such changes fall within the scope of the appended claims.

Having described the invention, what is claimed as new is:

1. A line fastener of the class described comprising a shank, a tapering end formed upon said shank and having an abrupt lateral shoulder portion at its base terminating in a rearwardly extending finger spaced from the shank to provide a restricted neck to receive a line which is adapted to be passed around the neck and between the shank and finger to lock the line in position, the rearwardly extending finger being inset with respect to said abrupt shoulder.

2. A line fastener of the class described formed from a single strand of wire and comprising a shank, an anchoring means at one end of the shank, the outer end of the shank being brought upwardly and rearwardly on an incline and then being bent backwardly on itself to provide a tapering hook, the tapering hook having an outwardly bent abrupt shoulder portion offset with respect to the longitudinal axis of the shank and offset laterally with respect to the shank, the extremity of the hook extending rearwardly to provide a finger spaced laterally from the shank and having an outwardly turned portion at its outer end to facilitate the guiding of a line between the shank and the finger, the finger being inset with respect to the shoulder portion, and the shoulder portion constituting means to hold a knot formed in a line from slipping off the hook.

3. A line fastener of the class described comprising a shank, the fastener being formed from a single strand of wire, the ends of the shank being bent to provide oppositely extending tapering hooks extending laterally of and upon opposite sides of the shank, the hooks having abrupt laterally extending shoulder portions terminating in inset longitudinally extending fingers spaced from the shank, the fingers of the respective hooks extending in opposite directions, and the spaces between the fingers and the shank providing channels into which a line may be passed after the line is wrapped around the shank and the fingers to efficiently lock the line in position.

4. A line fastener of the class described formed from a single strand of wire and comprising a shank, an anchoring means at one end of the shank, the outer end of the shank being brought upwardly and rearwardly on an incline and then being bent backwardly on itself to provide a tapering hook, the tapering hook having an inwardly bent abrupt shoulder portion offset laterally with respect to the longitudinal axis of the shank and offset laterally with respect to the shank, the extremity of the hook extending rearwardly to provide a finger spaced laterally from the shank and inset with respect to said shoulder portion and having an outwardly turned portion at its outer end to facilitate the forming of two loops, the shoulder portion constituting means to force the first loop backwards and over the top of the second loop, thus forming a knot when pulling on the free end of a line, to provide a slip knot for taking up slack, and locking on a reverse pull.

JOHN I. W. CARLSON.